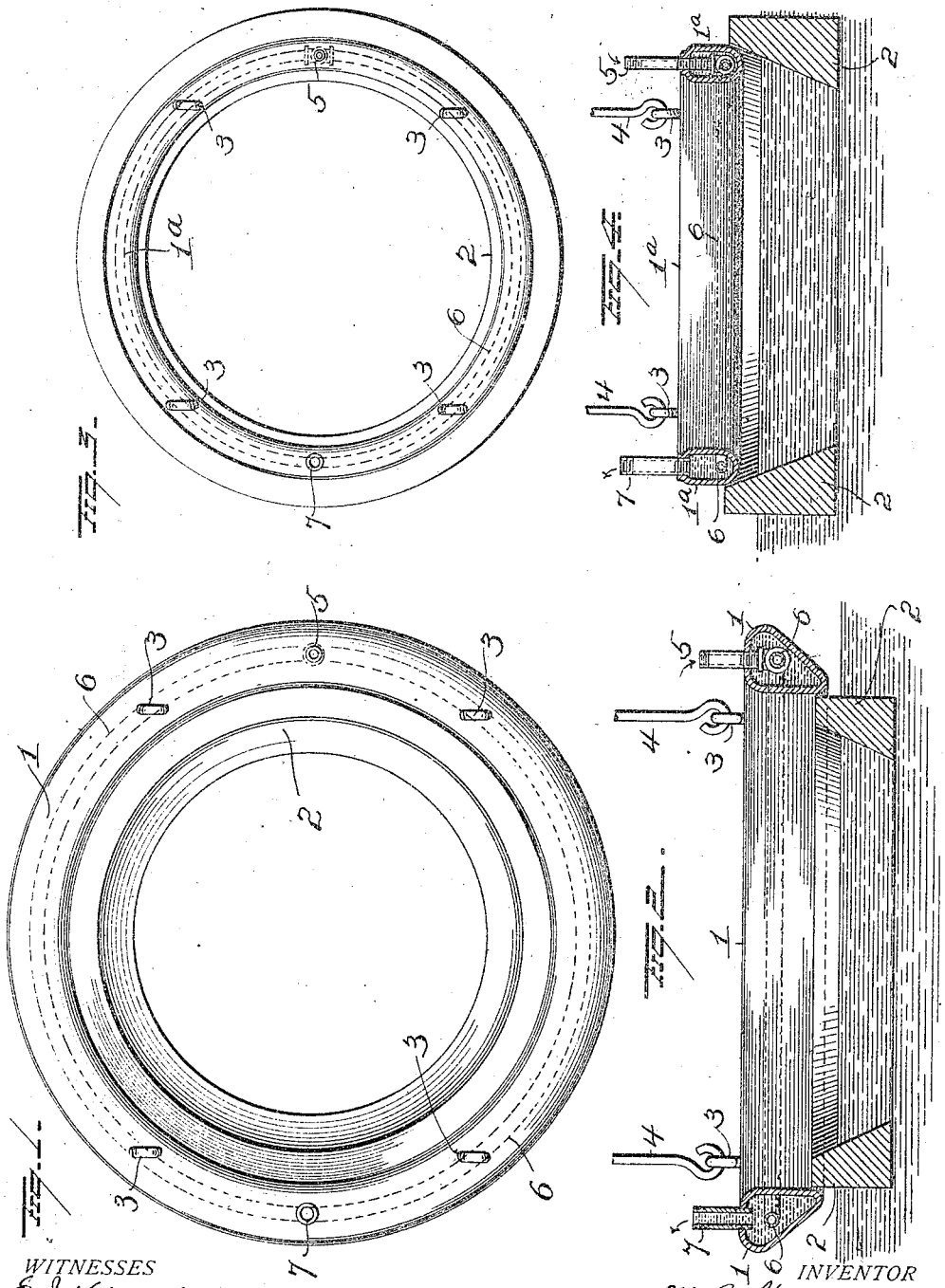

UNITED STATES PATENT OFFICE.

MACK J. HEALY, OF BRADFORD, PENNSYLVANIA, ASSIGNOR TO CONSOLIDATED WINDOW GLASS COMPANY, OF BRADFORD, PENNSYLVANIA.

RING-SHIELD FOR GLASS-DRAWING APPARATUS.

1,034,445.  Specification of Letters Patent.  Patented Aug. 6, 1912.

Application filed September 8, 1911. Serial No. 648,371.

*To all whom it may concern:*

Be it known that I, MACK J. HEALY, a citizen of the United States, residing at Bradford, in the county of McKean and State of Pennsylvania, have invented certain new and useful Improvements in Ring-Shields for Glass-Drawing Apparatus; and I do hereby declare the following to be a full, clear, and exact description of the invention, such as will enable others skilled in the art to which it appertains to make and use the same.

My invention relates to an improvement in ring shields for glass drawing apparatus.

Heretofore the ring shields, which are used to center the floating rings under the drawing opening of a glass tank or other receptacle containing molten glass, and also to shield the lower end cylinder being drawn, have been made of clay or other refractory material. Clay rings are objectionable in that they cannot stand the intense heat to which they are subjected, for any considerable length of time without cracking or disintegrating, and when they disintegrate the small particles drop into the molten glass adjacent the cylinder, and seriously affect the quality of the glass. Again, molten glass coming into contact with clay, will adhere to it, and in a short time become burnt or vitrified and drop back into the molten glass adjacent the cylinder and impair the quality of the glass.

My present invention consists in a hollow metal shield ring connected with a water supply whereby the temperature of the ring may be controlled, the ring prevented from scaling, and the temperature of the glass at the drawing point be regulated.

In the accompanying drawings, Figure 1 is a view in plan of my improved ring shield. Fig. 2 is a view in section of same showing it applied to a floating ring and Figs. 3 and 4 are similar views of a modification.

1 represents the ring shield, made of metal, and of approximately triangular shape in cross section, the angles of the triangle being preferably rounded. This shield is hollow with its wider diameter at the top, and its inner wall approximately vertical, so as to receive and snugly embrace the outer wall of the floating ring 2 as clearly shown in Fig. 2. This shield ring 1 is provided with eyes 3 to which suspension links or chains 4 are attached for supporting and elevating and lowering the ring shield in the well known manner.

The ring shield 1, is, as before explained, hollow, and carries a water inlet pipe 5, to which is secured the endless or ring shaped pipe 7 perforated on its underside for the free escape of the water into the ring shield 1, and the latter is also provided at a point preferably diametrically opposite the inlet pipe 5, with an outlet pipe 6 through which the water escapes from the ring shield. By this arrangement, water can be passed through the shield ring rapidly or slowly, and at different temperatures. By cooling the ring shield it can be kept clean and the formation of scale prevented and by increasing the amount of cool water passing through the ring shield, I can chill or control the temperature of the glass at the drawing point, thus enabling me to draw faster than is possible with the clay shield.

The construction shown in Figs. 3 and 4 is substantially the same as that previously described except that the ring shield 1ª is oval in cross section instead of triangular, and engages the upper edge of the inner wall of the floating ring 2 instead of the outer circumference of said ring. By using the smaller ring shield as shown in Figs. 3 and 4, I can make the furnace more compact, and locate the drawing openings nearer together, than is possible with the larger rings.

I would have it understood that I do not confine myself to any particular shape in cross section of the ring shields, but have simply illustrated the shapes, which in practice, I have found well suited for the purpose.

Having fully described my invention what I claim as new and desire to secure by Letters-Patent, is:—

1. The combination of a hollow metal ring shield provided with means whereby it may be raised and lowered and also with water inlet and outlet, and a floating ring held in place by direct engagement with the metal ring.

2. A hollow metal ring shield for glass drawing apparatus provided with a water inlet pipe, a perforated pipe within said shield and connected with said water inlet pipe, a water outlet pipe carried by the shield and communicating with the interior of the latter and suspension means for said shield.

3. A hollow metal ring shield for glass drawing apparatus, the said shield being substantially triangular in cross section with its inner wall vertical for engagement with the outer wall of a floating ring, a water inlet pipe leading into the interior of said shield, a perforated endless or ring shaped pipe communicating with said inlet pipe, an outlet pipe communicating with the interior of said shield, and suspension means for the latter.

In testimony whereof, I have signed this specification in the presence of two subscribing witnesses.

MACK J. HEALY.

Witnesses:
R. GOE,
WM. H. MORRISON.